Oct. 13, 1970      R. D. AUNGST      3,534,229
CAPACITOR BANK ARRANGEMENT

Filed March 11, 1969      2 Sheets-Sheet 1

INVENTOR
Robert D. Aungst
BY
ATTORNEY

United States Patent Office 3,534,229
Patented Oct. 13, 1970

3,534,229
CAPACITOR BANK ARRANGEMENT
Robert D. Aungst, Bloomington, Ind., assignor to Westinghouse Electric Corporation, Pittsburgh, Pa., a corporation of Pennsylvania
Filed Mar. 11, 1969, Ser. No. 806,076
Int. Cl. H01g *1/03, 1/08;* H02b *1/04*
U.S. Cl. 317—99      10 Claims

ABSTRACT OF THE DISCLOSURE

A compact capacitor bank arrangement comprises a plurality of capacitor units and switching devices supported upon a centrally located, vertically extending rigid support structure, the capacitor units extending radially outwardly from the rigid structure in vertical planes, in a Y configuration, and the switching devices being located in the areas between the vertical planes of the capacitor units.

BACKGROUND OF THE INVENTION

The present invention relates to an arrangement for supporting capacitor units in a compact, space saving manner that is particularly suitable for underground installations used in the distribution of electrical power.

A current trend in the distribution of electrical power is in the direction of underground distribution systems. This has created a demand for power capacitor equipment suitable for underground applications. Heretofore, the use of capacitor equipment in underground installations has been limited because of high costs and the inability to dissipate the heat produced by the capacity units.

Recent developments, however, have reduced costs and heat dissipation problems to workable levels. More particularly, costs have been reduced by the development of relatively large diameter earth augers employed for digging holes sized to accommodate distribution transformers, open-ended inexpensive cylindrical liners serving as vaults, and practical, high voltage, waterproof electrical connectors and switches suitable for use under submerged, flooded conditions. The heat dissipation problem has been reduced by the development of improved dielectric systems which reduce the heat generating losses within the capacitor units.

BRIEF SUMMARY OF THE INVENTION

What is presently needed is a compact capacitor bank or stack arrangement (with appropriate switching devices) suitable for use in areas subject to flooding and in confined spaces provided in the ground, for example, the space within one of the above mentioned liners and auger made holes. This need is supplied by the structure of the present disclosure, more particularly, by capacitor units mounted in a 120 degree spaced apart or Y configuration with associated waterproof switches and switch control connections disposed between and adjacent the sides of the capacitor units. Such a structure can be disposed in a minimum diameter cylindrical liner, the geometrical configuration of the structure providing an optimum spacing arrangement between capacitor units for heat radiation and air current convection. The switches are located for ready access by the customer-user, thereby making inspection, maintenance and installation easy for the user. The upper end of the liner remains open (to be covered only by a grate) to allow generated heat to escape to the atmosphere. A rain covering and a sealed liner are not required since the connectors and switches, as well as the capacitor units, are waterproof devices suitable for submerged operation.

THE DRAWINGS

The invention, including the advantages and objectives thereof, will best be understood from reading the following detailed description in connection with the accompanying drawings in which.

PREFERRED EMBODIMENT

Figure 1:
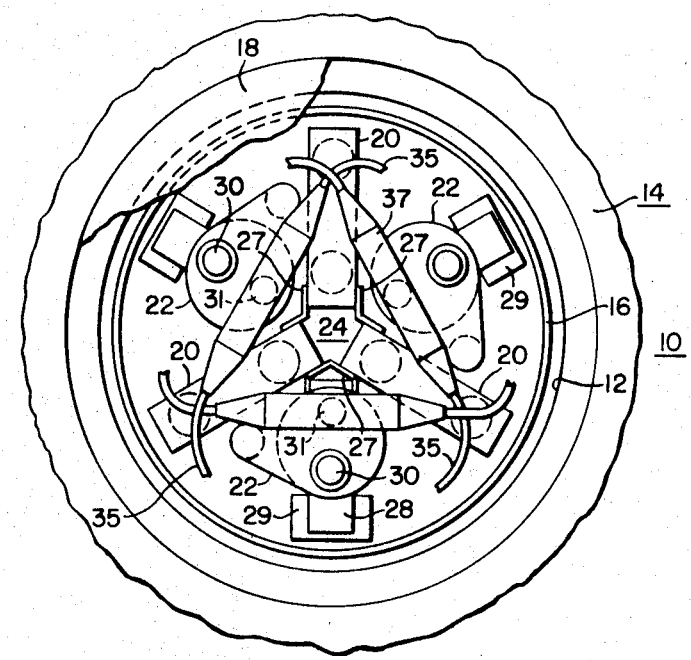
FIG. 1 is a top plan view of a capacitor bank or stacking arrangement constructed in accordance with the principles of the present invention.
Figure 2:
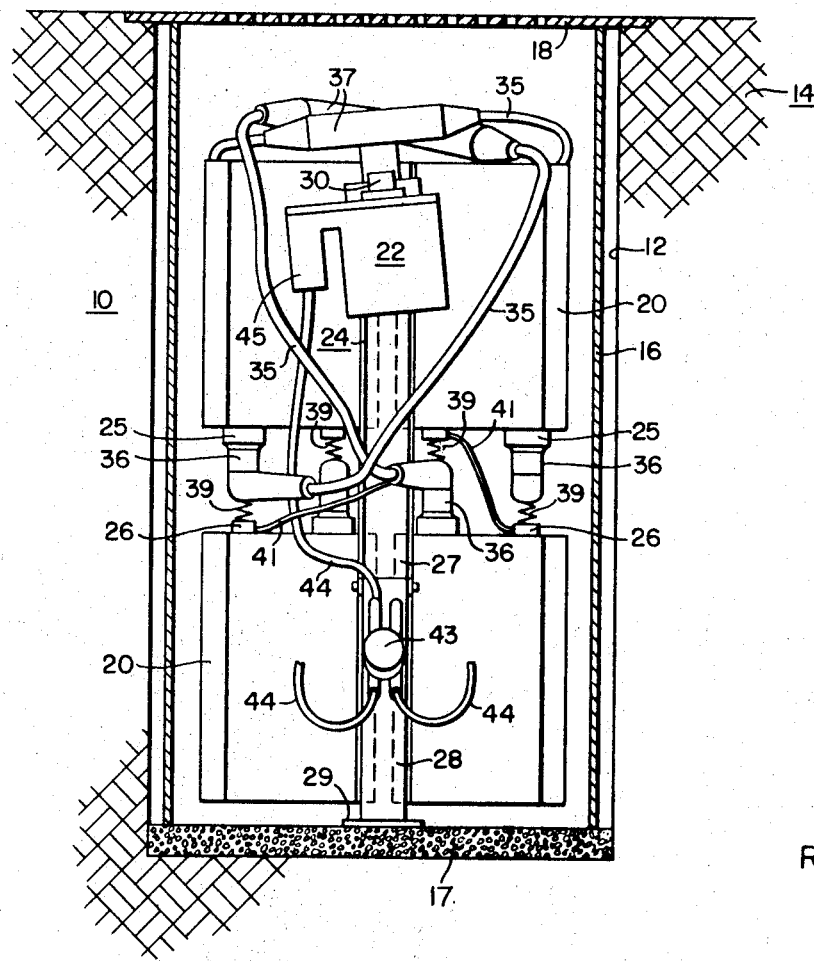
FIG. 2 is a side elevation view of the arrangement of FIG. 1.

Specifically, there is shown in FIGS. 1 and 2, a compact capacitor arrangement 10 constructed to occupy a minimum of space, for example, the limited space made available by relatively large diameter earth digging augers employed for locating distribution transformers underground, though the invention is not limited thereto. In FIGS. 1 and 2, an opening or hole 12 is shown provided in the ground 14, and a cylinder or liner 16, which may be open at both ends, disposed therein. The bottom of the earth opening 12 may be provided with a bed of gravel 17 or other suitable material for seating the arrangement 10 in the manner described hereinafter. On top of the cylinder, at or near ground level is disposed a grate structure 18.

As shown in FIGS. 1 and 2, the capacitor arrangement 10 is located in the cylinder 16, the arrangement 10 including six capacitor units 20 and three sealed switching devices 22 supported on a centrally disposed, elongated, rigid support structure 24.

The capacitor units 20 are disposed and supported in two groups vertically aligned and separated along the axis of the support structure 24 (FIG. 2), the capacitor units in each group being disposed to radiate outwardly from the support structure in vertical planes that are spaced apart by 120 degrees, as best seen in FIG. 1. The configuration of each group is generally that of a Y configuration.

As best seen in FIG. 2, each capacitor unit 20 may be provided with a line terminal bushing 25 and a neutral or ground terminal 26, and the capacitor units are supported in such a manner that the pair of capacitors in each vertical plane have their terminals facing each other and in close proximity to each other. Further, the line terminal bushing of the upper capacitor in each pair is located directly over the ground terminal of the lower capacitor.

The support structure 24 may comprise three rigid vertical members 27 angularly formed to provide portions conforming to the 120 degree spaced apart planes of the capacitor units 20. The members are suitably disposed to engage the radially inner side portions of each capacitor unit, as shown in FIG. 1, and are rigidly attached to the capacitor units. The support structure includes further an angularly disposed leg member 28 attached to each of the angle members 27 as best seen in FIG. 2. The leg members may each be provided with a planar foot member or portion 29 disposed to rest on the bed 17 as shown in FIG. 2. In this manner, the arrangement 10, as thus far described, is supported in a vertically upright manner in the hole 12.

Figure 3:
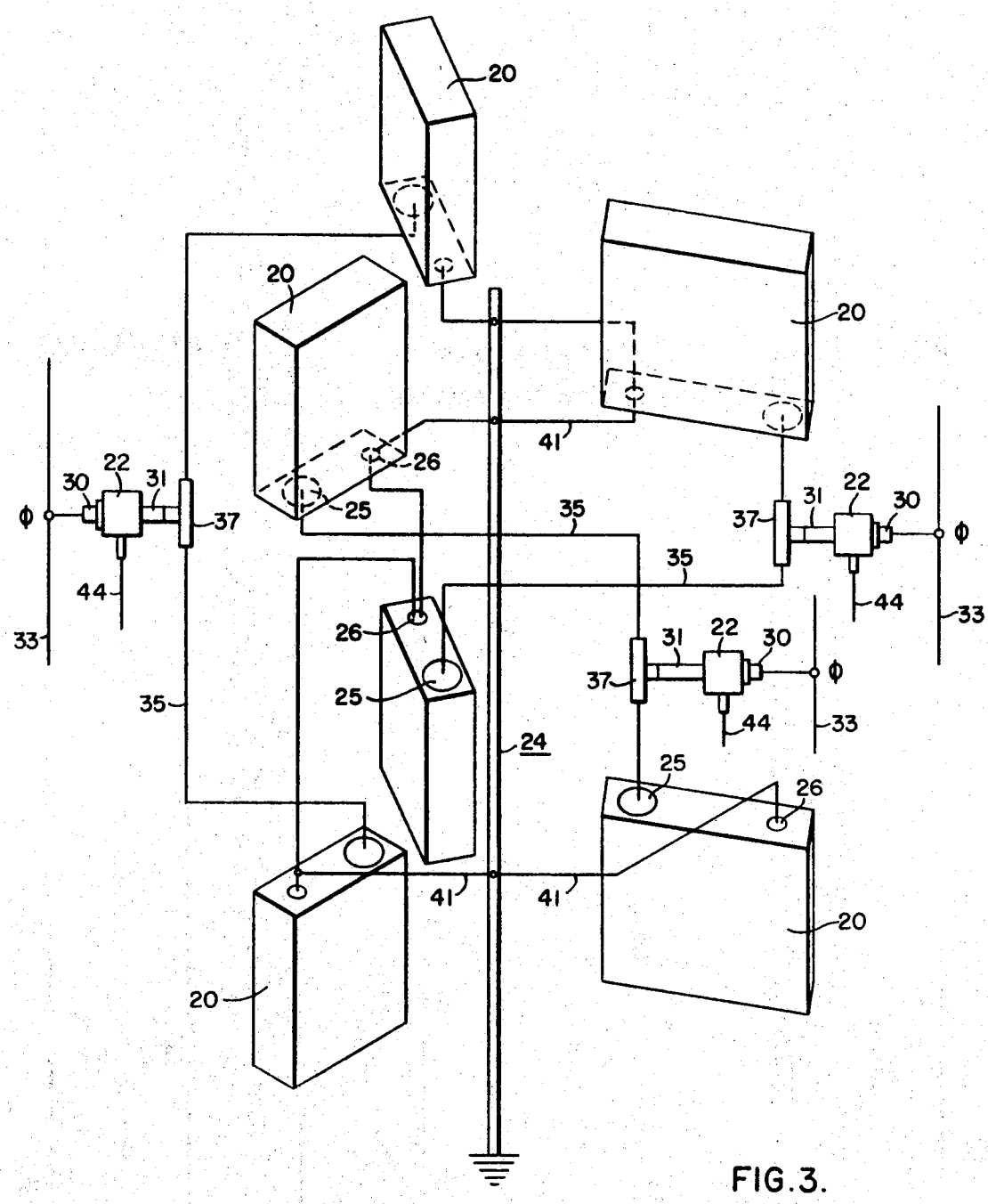
FIG. 3 is a diagrammatic view of the arrangement of FIGS. 1 and 2 showing circuit connections.

Between the planes of the capacitor unit 20 in the upper Y group are physically disposed the three switching devices 22, the devices being respectively suitably attached to the rigid angle members 27. Each switching device comprises a sealed unit, and may be a relay type of device suitably energized by application of a switching signal. The top portion of each switch is provided with two terminal bushings 30 and 31, only one of which (30)

is visible in FIGS 1 and 2. As indicated in FIG 3, the bushings 30 provide means for connecting the capacitor arrangement 10 to three-phase lines 33, though the invention is not limited to a three-phase system. As seen in FIG. 2, the bushings are located at the top of the capacitor arrangement 10 so as to be near the surface of the ground and face in an upward direction to permit easy access thereto by the user of the equipment.

The capacitor units 20 are electrically interconnected by a plurality of relatively heavy, current conducting cables 35 extending between the capacitor bushings 25 and the bushings 31 of the switching devices 22. The two ends of each of the cables are provided respectively with an L-shaped connector 36 and a T-shaped connector 37, the connectors engaging the bushings in a water tight manner and in electrical contact therewith. More particularly, the L-shaped connectors are disposed to engage the capacitor bushings 25, and the T-shaped connectors are disposed to engage the bushings 31 of the switching devices 22 at the top of the arrangement 10. The switching ends of the capacitor units so that the L-shaped con- 24 in a tilted manner (FIG. 2) to allow the T-shaped connectors to overlap each other in a space saving manner.

The connectors 36 and 37 are submersible type high voltage connectors, preferably of the type described in applicant's copending application Ser. No. 797,644 filed Feb. 7, 1969 and assigned to the present assignee. Such connectors are made of waterproof elastomeric materials formed to engage a mating bushing or fitting in a water tight manner.

The L-shape connectors 36 are located between the facing ends of the capacitor units so that the L-shaped connectors are located in vertical alignment between the aligned terminals of the capacitors in the lower group and the capacitors of the upper group. The connectors 36 connect the cables 35 to the line terminals 25 of each capacitor. In order to maintain the L-shape connectors in firm engagement with their respective capacitor terminal bushings, a coil spring structure 39 is disposed and compressed between each connector 36 and the adjacent ground terminal 26.

To complete the capacitor connections in the arrangement 10 as depicted in the figures, the ground terminal 26 of each capacitor 20 is connected to a common ground, which, as shown in FIG. 3, is the central support structure 24 for the capacitor units and switches. This may be accomplished by the use of metal leads or straps 41 connecting the ground terminals together and to the support structure, the ends of the leads 41 being secured to the terminals 26 beneath the coil springs 39.

The circuit of the capacitor arrangement 10, as thus far described, is that of an electrical Y configuration with the power lines 33 (FIG. 3) of a three-phase system respectively connected to the terminals 30 of the switching devices 22. The circuit of the invention, however, is not limited to a three-phase system, nor to the electrical Y configuration. By appropriate arrangement of interconnecting leads or cables, the capacitors may be connected for single-phase operation or they may be connected in a delta configuration for a three-phase system.

The switching devices 22 are connected to a water tight junction device 43 via leads 44, the device providing a means for connecting the switches to an external switch control and operating circuit (not shown). The junction device is shown mounted on one of the leg members 28 in FIG. 2. The switch ends of the leads 44 are connected to their respective switches through water tight connectors 45.

External circuit conductors, i.e. the line conductors 33 (FIG. 3), and wires (not shown) for conducting the switching signals, extend underground and enter into the liner 16 through openings (not shown) suitably provided therein.

It should now be apparent from the foregoing description that a new and useful capacitor arrangement and combination has been disclosed, said arrangement and combination providing a compact structure particularly suitable for underground installation and submerged conditions. More particularly, the arrangement permits the use of openings or vaults provided in the earth of a size ordinarily limited to distribution transformers. This is accomplished by supoprting capacitor units on a centrally disposed rigid support structure, and in a manner that the units extend radially outwardly therefrom in vertical planes spaced apart by 120 degrees. Between these planes are conveniently supported switching devices which allow circuit control of the units. All electrical connections are made with submersible type connectors, and the spacing of the capacitor units provides cooling therefor by virtue of convection paths therebetween. Heat rises from the units through a grate located over a minimum diameter liner or shell located in the earth opening and around the capacitor arrangement.

Though the invention has been described with a certain degree of particularity, changes may be made therein without departing from the spirit and scope thereof. For example, the top of the arrangement 10 need not be located below the level of the earth as shown in FIG. 2. It may extend above ground level in which case the grate 18 could take the form of an inverted bowl or some other type of cover structure provided with openings to allow the escape of heat to the atmosphere.

What is claimed is:

1. A capacitor bank arrangement particularly suitable for underground installation comprising:
   a plurality of electrical capacitor units,
   a structure supporting said capacitor units about a central vertical axis in vertical planes radiating outwardly therefrom,
   said capacitor units disposed in vertically aligned groups separated along said axis,
   said structure comprising
   an elongated rigid member extending along said vertical axis between said capacitor units,
   means for securing said capacitor units to the rigid member, and
   switching devices attached to the rigid member, said devices being disposed in close proximity to said capacitor units and in the spaces between the vertical planes of said units.

2. The arrangement described in claim 1 in which the vertical planes of the capacitor units are displaced 120 degrees apart about the vertical axis.

3. The arrangement described in claim 1 in which the capacitor units are arranged in three pairs about the vertical axis with the two units in each pair disposed in vertical alignment, and said pairs being displaced from each other about the vertical axis by 120 degrees.

4. The arrangement described in claim 1 in which the capacitor units are connected together in an electrical Y configuration for three-phase operation.

5. The arrangement described in claim 1 including angularly disposed leg members attached to the rigid member for supporting the arrangement in an upright manner.

6. The arrangement described in claim 2 in which the rigid member comprises three elongated rigid members,
   said members being angularly formed to provide portions conforming to the 120 degree spaced apart planes of the capacitor units,
   said members being secured to the radially inner side portions of the capacitor units.

7. The arrangement described in claim 1 including water tight connectors and cables for interconnecting the capacitor units and switching devices, the capacitor units and switching devices being water tight devices so that the arrangement is adapted to function normally in a submerged or flooded environment.

8. The subject matter of claim 1 wherein: each of said capacitor units has a pair of terminals on a face thereof toward another of said vertically aligned groups.

9. The subject matter of claim 8 wherein: said pair of terminals includes a line terminal and a neutral terminal; said line terminals of capacitors in one of said vertically aligned groups being disposed in direct facing relation with said neutral terminals of capacitors in another of said vertically aligned groups; connectors are on said terminals with a spring disposed between facing line and neutral terminal connectors for firm engagement.

10. The subject matter of claim 1 wherein: said plurality of capacitor units are disposed within a single enclosure which is at least in substantial part below ground level, a face of said enclosure near ground level having a cover with openings therethrough to permit heat to escape.

References Cited

UNITED STATES PATENTS

| | | | |
|---|---|---|---|
| 1,991,707 | 2/1935 | Silbermann | 317—260 |
| 2,107,132 | 2/1938 | Smith | 317—260 |
| 2,871,416 | 1/1959 | Steinbarge | 317—99 |
| 3,254,270 | 5/1966 | Aungst | 317—99 |

LARAMIE F. ASKIN, Primary Examiner

G. P. TOLIN, Assistant Examiner

U.S. Cl. X.R.

317—256